UNITED STATES PATENT OFFICE.

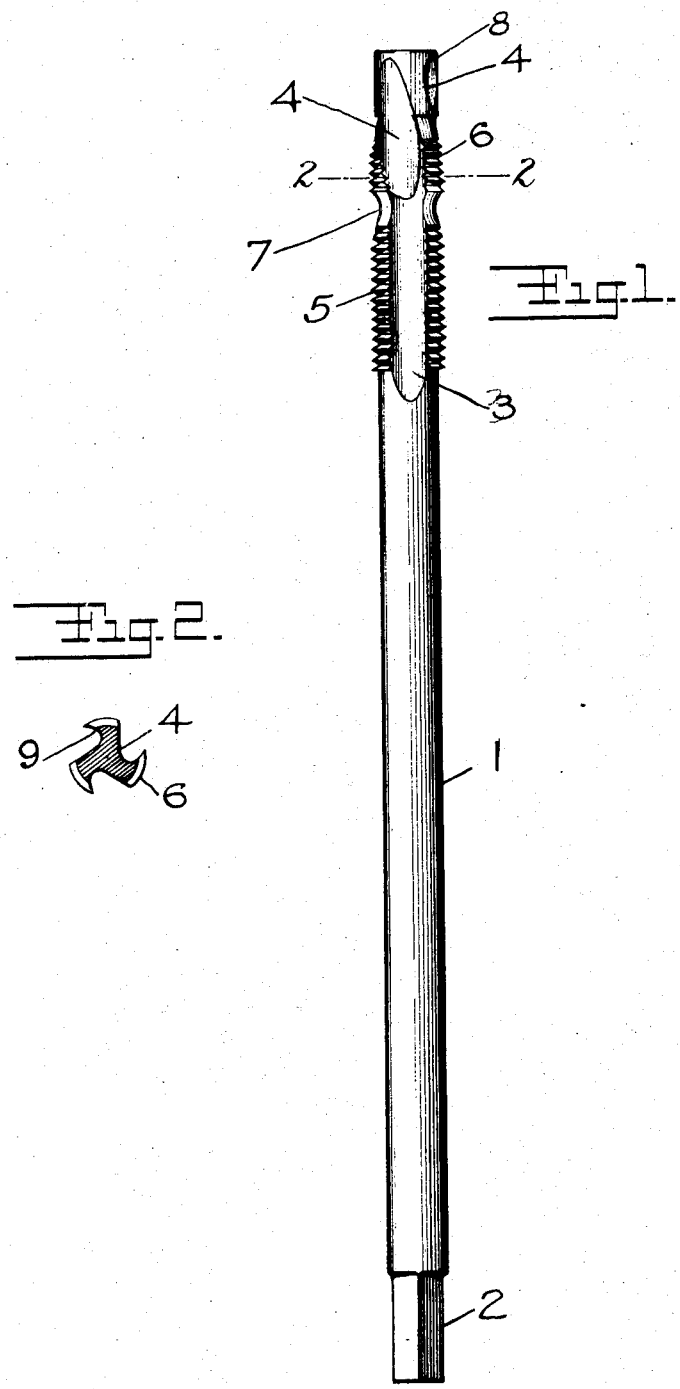

FRANK OREN WELLS, OF GREENFIELD, MASSACHUSETTS, ASSIGNOR TO GREENFIELD TAP AND DIE CORPORATION, OF GREENFIELD, MASSACHUSETTS, A CORPORATION OF MASSACHUSETTS.

TAP.

1,345,425.  Specification of Letters Patent.  Patented July 6, 1920.

Application filed June 30, 1919. Serial No. 307,701.

*To all whom it may concern:*

Be it known that I, FRANK OREN WELLS, a citizen of the United States of America, residing at 9 Grinnell street, Greenfield, Massachusetts, U. S. A., have invented new and useful Improvements in Taps, of which the following is a specification.

My invention relates to taps for screw-threading holes, and has for its particular object to provide a tap capable of performing both the roughing and finishing operations so as to complete the threading of the work by a single use of the one tool, and yet to perform the different grades of cutting each at a maximum speed, thus making it possible to thread work in less time and with less effort than by the use of the heretofore known types of taps.

With the foregoing object in mind and such others as appear from the specification, my invention consists in the construction, combination, and arrangement of parts herein illustrated, described and claimed.

In the accompanying drawings, I have shown a preferred embodiment of my invention. In these drawings, in which similar reference characters designate corresponding parts in all views, Figure 1 is an elevation of a tap embodying the invention; and, Fig. 2 is a section taken approximately on the line 2—2 of Fig. 1.

Referring to these drawings, a tap made in accordance with my invention comprises a shank 1, having formed at the rear end a portion 2 adapted to receive a wrench, which may conveniently be square. Toward the forward end of the tap there are provided several flutes or grooves 3 extending longitudinally of the tap, and at their forward ends having angularly extending portions 4.

On the shank between these flutes, that is, on the lands, are formed finishing teeth 5 adjacent the longitudinal portions of the grooves, and roughing teeth 6 adjacent the angular portions. By reason of the angular disposition of the flutes adjacent the roughing teeth 6, these teeth are given a shearing action. These roughing teeth 6 are preferably chamfered, so that each tooth takes a substantially uniform and comparatively large cut, and by the time all of the teeth have entered the work, the work is roughly threaded, but is not quite to size. The finishing teeth 5 are formed of a slightly larger diameter than the roughing teeth 6, and have the forward teeth chamfered; and are numerous, so that by the time the complete set of finishing teeth have passed through the work, the work is threaded to size.

The shearing roughing teeth have a tendency to form a continuous chip which is ejected from the forward end of the work. The finishing cutting teeth being of somewhat larger diameter, a chamfer is desirable for entering, and in order that this may be suitably cut, a circumferential groove 7 is preferably provided between the roughing and finishing teeth.

It is also advantageous, and helps the speed of the operation, to provide a pilot or entering portion 8, of nearly the size of the hole about to be threaded, so as to serve as a steady guide to the teeth as they enter, and enable a positive thread to be established.

The flutes, and particularly the angularly disposed flutes, are preferably arranged with an undercut portion as indicated at 9 in Fig. 2, giving the teeth a suitable rake for cutting out the metal rapidly.

In operation, the tap is used in the ordinary manner, and simply run through the work once, thus performing both the roughing and finishing operations, and has the advantage that the roughing operations are rapidly performed by the shearing teeth on the forward portion, and the finishing operations are efficiently done by the usual form of finishing teeth, the circumferential groove 7 insuring that the work shall be cleared of chips before the finishing teeth enter the roughed out work, as well as providing for the chamfer for the entering teeth of the finishing portion, so that no special precautions are required on the part of the operator.

Having now described my invention I claim as new and desire to secure by United States Letters Patent:

1. A combination roughing and finishing tap provided with longitudinal flutes parallel to the axis for a portion of its length, said flutes having at their forward end angularly disposed portions, finishing teeth being formed along the longitudinal portions, and roughing cutting teeth formed along the angular edges of said flutes.

2. A combination roughing and finishing tap provided with longitudinal flutes for a portion of its length, said flutes having at their forward ends angularly disposed portions, cutting teeth formed along the edges of said flutes, and a circumferential groove at the junction of the longitudinal portions with the angular portions of said grooves.

3. In a combination roughing and finishing tap, finishing cutting teeth formed thereon, an angularly faced shearing roughing teeth formed thereon in advance of said finishing teeth, the sets of teeth being separated by a circumferential groove.

4. A combination roughing and finishing tap provided with longitudinal flutes parallel to the axis for a portion of its length, said flutes having at their forward ends angularly disposed portions, finishing cutting teeth formed on the lands adjacent the longitudinal portions of said flutes, and undercut, shearing, roughing teeth formed on the lands adjacent the angular portions of said flutes.

5. A combination roughing and finishing tap provided with longitudinal flutes parallel to the axis for a portion of its length, said flutes having at their forward ends angularly disposed portions, finishing cutting teeth formed on the lands adjacent the longitudinal portions of said flutes, the forward finishing teeth being chamfered, and shearing roughing teeth formed on the lands adjacent the angular portions of said flutes, and of smaller diameter than the finishing teeth.

In testimony whereof I have signed my name to this specification.

FRANK OREN WELLS.